(12) United States Patent
Schimik et al.

(10) Patent No.: US 11,543,252 B2
(45) Date of Patent: Jan. 3, 2023

(54) METHOD FOR OPERATING A SUPPORT SYSTEM FOR PREVENTING A MOTOR VEHICLE FROM BEING LEFT STRANDED, AND MOTOR VEHICLE

(71) Applicant: AUDI AG, Ingolstadt (DE)

(72) Inventors: Viktor Schimik, Bretzfeld (DE); Manuel Geisinger, Stuttgart (DE)

(73) Assignee: AUDI AG, Ingolstadt (DE)

( * ) Notice: Subject to any disclaimer, the term of this patent is extended or adjusted under 35 U.S.C. 154(b) by 145 days.

(21) Appl. No.: 16/330,322

(22) PCT Filed: Jul. 20, 2017

(86) PCT No.: PCT/EP2017/068370
§ 371 (c)(1),
(2) Date: Mar. 4, 2019

(87) PCT Pub. No.: WO2018/041466
PCT Pub. Date: Mar. 8, 2018

(65) Prior Publication Data
US 2019/0226861 A1   Jul. 25, 2019

(30) Foreign Application Priority Data

Sep. 5, 2016   (DE) .......................... 102016216701.4

(51) Int. Cl.
*G01C 21/34*  (2006.01)
*B60W 50/00*  (2006.01)
(Continued)

(52) U.S. Cl.
CPC ..... *G01C 21/3469* (2013.01); *B60W 50/0097* (2013.01); *B60W 50/14* (2013.01);
(Continued)

(58) Field of Classification Search
CPC .......... G01C 21/3469; B60W 50/0097; B60W 50/14; B60W 2540/215; B60W 2530/209;
(Continued)

(56) References Cited

U.S. PATENT DOCUMENTS 9,368,026 B1    6/2016  Herbach et al.
10,112,620 B2   10/2018 Matsumoto et al.
(Continued)

FOREIGN PATENT DOCUMENTS

CN    103688137 A   3/2014
CN    103703343 A   4/2014
(Continued)

OTHER PUBLICATIONS

International Search Report and Written Opinion of the International Searching Authority directed to related International Patent Application No. PCT/EP2017/068370, dated Nov. 7, 2017, with attached English-language translation; 23 pages.
International Preliminary Report on Patentability directed to related International Patent Application No. PCT/EP2017/068370, dated Mar. 5, 2019, with attached English language translation; 13 pages.

*Primary Examiner* — Tyler J Lee
*Assistant Examiner* — Yufeng Zhang
(74) *Attorney, Agent, or Firm* — Sterne, Kessler, Goldstein & Fox P.L.L.C.

(57) ABSTRACT

A method for operating a support system for preventing a motor vehicle from being left stranded due to a lack of drive energy is disclosed. The, wherein the motor vehicle has at least one driver assistance system and an internal combustion engine, which is operated with fuel as a first energy source of drive energy, and/or an electric motor, which is operated with electric energy of a battery as a second source of drive energy. The motor vehicle is autonomously driven to a charging and/or filling location using a vehicle system, which is designed to guide the motor vehicle in a fully automatic manner, when an emergency criterion is met (Continued)

which is constantly evaluated during an operational phase of the motor vehicle, and indicates to the driver that the motor vehicle will be left stranded if a charging and/or filling process is not carried out.

20 Claims, 1 Drawing Sheet

(51) Int. Cl.
  *B60W 50/14* (2020.01)
  *B60W 40/08* (2012.01)
  *G06V 20/59* (2022.01)
(52) U.S. Cl.
  CPC .................. *B60K 2370/175* (2019.05); *B60W 2040/0818* (2013.01); *B60W 2040/0872* (2013.01); *B60W 2510/244* (2013.01); *B60W 2530/209* (2020.02); *B60W 2540/215* (2020.02); *B60W 2540/22* (2013.01); *B60W 2554/00* (2020.02); *B60W 2556/50* (2020.02); *G06V 20/597* (2022.01); *Y02T 10/84* (2013.01)
(58) Field of Classification Search
  CPC ......... B60W 2556/50; B60W 2554/00; B60W 2040/0818; B60W 2040/0872; B60W 2510/244; B60W 2540/22; B60K 2370/175; G06K 9/00845; Y02T 10/84
  See application file for complete search history.

(56) References Cited

U.S. PATENT DOCUMENTS

| | | |
|---|---|---|
| 2011/0309926 A1 | 12/2011 | Eikelenberg et al. |
| 2013/0317986 A1* | 11/2013 | Tucker .................. G07F 19/201 |
| | | 705/43 |
| 2014/0156108 A1 | 6/2014 | Reich |
| 2015/0051778 A1 | 2/2015 | Mueller |
| 2015/0073631 A1 | 3/2015 | Lim et al. |
| 2015/0348335 A1 | 12/2015 | Ramanujam |
| 2016/0009296 A1* | 1/2016 | Iguchi .................. B60W 50/14 |
| | | 701/36 |
| 2016/0071418 A1 | 3/2016 | Oshida et al. |
| 2017/0015318 A1* | 1/2017 | Scofield ............... G05D 1/0088 |
| 2017/0361843 A1 | 12/2017 | Attensperger et al. |

FOREIGN PATENT DOCUMENTS

| | | |
|---|---|---|
| CN | 104424511 A | 3/2015 |
| DE | 102005016006 A1 | 10/2006 |
| DE | 102009050404 A1 | 5/2011 |
| DE | 102010030309 A1 | 12/2011 |
| DE | 102010061065 A1 | 6/2012 |
| DE | 102011106357 A1 | 8/2012 |
| DE | 102011075872 A1 | 11/2012 |
| DE | 102015001248 A1 | 8/2016 |
| DE | 102015002913 A1 | 9/2016 |

* cited by examiner

METHOD FOR OPERATING A SUPPORT SYSTEM FOR PREVENTING A MOTOR VEHICLE FROM BEING LEFT STRANDED, AND MOTOR VEHICLE

TECHNICAL FIELD

An embodiment relates to a method for operating a support system for preventing a motor vehicle from being left stranded due to a lack of drive energy, wherein the motor vehicle has at least one driver assistance system and an internal combustion engine, which is operated with fuel as a first energy source of drive energy, and/or an electric motor, which is operated with electric energy of a battery as a second source of drive energy, respectively, as the drive means. An embodiment also relates to a motor vehicle.

BACKGROUND

Modern motor vehicles frequently include a variety of driver assistance systems. The task of such driver assistance systems is to provide functions that are able to relieve the driver of the motor vehicle. Driver assistance systems are known, for example, to operate as alertness assistants. In particular, they recognize the state of the driver, his/her state of fatigue, and are able to output corresponding instructions and/or to carry out measures. Other driver assistance systems relate to the remaining range of the motor vehicle, which may be determined, for example, based on the fuel tank content in the case of an internal combustion engine using fuel and/or based on the state of charge (SOC) of the battery in the case of an electric motor, optionally, while adding additional pieces of information, in order to display them to the driver. Assistance systems for bypassing traffic congestion, which evaluate traffic congestion reports relating to the surroundings in which the motor vehicle is operated, are also known. Navigation systems, able, for example, to utilize digital map data, in general are enjoying wide popularity. For such navigation systems, it has already been proposed to expand them by so-called "points of interest" (POI), for example, giving information on places of interest and/or restaurants. With regard to an autonomous operation of the motor vehicle as well, vehicle systems for at least partial automatic guidance of motor vehicles have already been proposed, and are for example, of the type that offer parking assistance to a parking lot and/or that adjust the motor vehicle, in particular, in the case of contactless charging, into an ideal charging position, for charging a battery.

A variety of driver assistance systems or functions of driver assistance systems also address the drive energy of the motor vehicle and its maximally favorable procurement. Thus, for example, motor vehicle-external functions, for example, in the form of so-called apps, have been proposed, which compare fuel costs at various fueling locations, such as service stations, and, as an extension of navigation systems in general, provide information about available charging and fueling locations, i.e., for example the position of service stations (diesel, gasoline, gas hydrogen, . . . ) and/or charging stations or charging devices in general for motor vehicles.

Driver assistance systems for motor vehicles having electric engines and an associated battery have already been described, whereby it is proposed, for example, to perform the charging operations in a cost-optimized manner by utilizing navigation data. In such a case, the navigation data of possible journeys are stored in the navigation system, where the required energy demands to reach the destinations are calculated on the basis of the navigation data. An energy management system determines the required charge energy needed based on the state of charge of the battery and on the required energy demand in order to reach the destinations, wherein it may be determined, aided by knowledge of the required individual charge energies and the overall required charge energy, when it makes sense for economic reasons to charge the battery and to what level. In this case, the battery may be charged in a manual or automated manner. This proposal involves future planned or expected journeys, whereby the required amount of charge of energy, as well as the optimum charge times and respective optimum charging locations, may be fed back via a display unit in or outside the motor vehicle.

Support systems, such as that of DE 10 2011 075 872 A1 do not operate during operating phases, i.e., in particular, during the use of the motor vehicle for driving, and therefore offer no possibility of reacting to situations occurring during the driving phase. Thus, in spite of the pre-planning undertaken, it may happen that the motor vehicle runs out of drive energy, since there are no longer any energy sources available, and the motor vehicle comes to a stop.

US 2015/0348335 A1 relates to the performance of service work on autonomous vehicles. In this case, the vehicle itself is able to detect whether a service has to be performed, where a service center for performing the service is selected, and the autonomous vehicle is automatically moved to the service center. The services implementable in this way also include refueling the motor vehicle or charging a battery.

DE 10 2005 016 006 A1 relates to an information system and to a method for supplying pieces of service station information for a motor vehicle. If a fuel quantity and/or a remaining range of the vehicle drop(s) below an respective assigned threshold value, the service stations reachable within the determined remaining range, together with the associated pieces of current fuel cost information, are ascertained. A navigation system may automatically ascertain a driving route to the nearest service station if, besides this service station, no other service station is reachable within the determined remaining range. A navigation system may also offer a driving route to the selected service station in order to prevent the user of the motor vehicle from losing his/her way and becoming stranded along the way due to the lack of fuel.

US 2015/0051778 A1 relates to a vehicle and a method for controlling a vehicle. In this method, the vehicle includes a movement system able to influence the movement of the vehicle, which may be operated in a normal mode or an emergency mode. During autonomous driving of the vehicle, which movement systems are available are constantly checked, so that the autonomous movement may be maintained or deactivated through the use of suitable emergency modes.

DE 10 2010 061 065 A1 relates to a navigation unit, in particular, for an electric vehicle, wherein the nearest reachable electric service station is determined as the destination when an available range relative the distance to the entered navigation destination falls short.

DE 10 2015 001 248 A1 relates to a method and a system for operating a motor vehicle. In this case, what remaining range a motor vehicle will have at the destination is ascertained, wherein if the remaining range falls short of a predefined threshold value, the motor vehicle is operated in a consumption optimized mode, in which measures are assessed with regard to the savings potential and to the limitation of the driver, and are utilized in such a way that the motor vehicle reaches the destination with a remaining range that corresponds at least to the threshold value and the limitation of the driver is minimized by the measures.

DE 10 2009 050 404 A1 relates to a method for controlling the operation of a fully automatic driver assistance system of a motor vehicle designed for independent vehicle guidance, and a motor vehicle. In this method, a driver takeover request is outputted when at least one takeover condition occurs, wherein it is continuously monitored by evaluating sensor data whether the driver is still able to react quickly enough to a driver takeover request. If the status values as compared with comparison values indicate that the driver is not ready to take over and is unable to react quickly enough to the driver takeover request, either a warning or a driver takeover request is outputted.

BRIEF DESCRIPTION OF THE DRAWINGS/FIGURES

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

DETAILED DESCRIPTION

Figure 1:
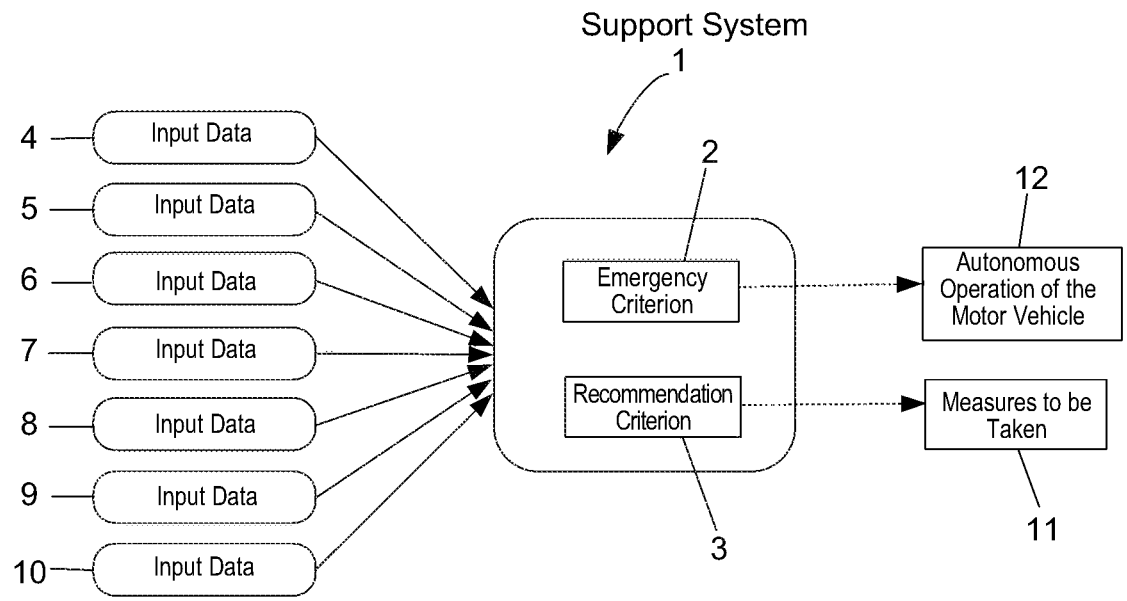
FIG. 1 shows a schematic sketch of the functionality of the support system, according to certain embodiments of the invention.

The object of the presented embodiments, is to provide a better option for supporting the driver with respect to the drive energy resources of the motor vehicle.

In an embodiment, the emergency criterion continuously monitors the status of the motor vehicle with respect to whether a loss of drive energy, and thus a possibility of the driver being stranded, is imminent, based on current input data, utilizing in particular the processing data of other driver assistance systems. The emergency criterion therefore combines pieces of information from the driver assistance systems, as well as, optionally, additional pieces of information about the motor vehicle and/or about its driver, in order to deduce from the collected information when a charging (in the case of a battery associated with an electric engine) or a filling (in the case of an internal combustion engine and/or a tank associated with a fuel cell) must take place, in order to be able to ensure the further operability of the motor vehicle. In this case, the support system may thus instruct a vehicle system for autonomously guiding the motor vehicle to automatically move the vehicle, i.e., without the driver him/herself having to manage it, to a charging location and/or filling location, for example, to a service station and/or to a charging station. In this way, obstacles for the driver are eliminated by the prevention of a stoppage due to an empty tank and/or due to an empty battery.

In principle, it is conceivable in this case that the motor vehicle directly assumes control of the vehicle guidance from the driver in order to drive to the charging location and/or to the filling location. Within the scope of the present invention, however, it is preferred that the autonomous driving takes place upon meeting the emergency criterion, following the output of a corresponding piece of emergency information, and a confirmation by the driver. In this way, the driver is informed that a filling operation and/or charging operation is/are absolutely essential in order to ensure the further operability of the motor vehicle, and he/she may correspondingly confirm the function for autonomously delivering the motor vehicle to a location at which the filling and/or charging operation is possible. In general, however, it is particularly expedient if the support system is configurable as a whole by the driver, such that it is also conceivable, if, after prior configuration by the driver and/or after outputting the emergency information, the autonomous driving takes place upon meeting the emergency criterion without prior confirmation by the driver. The emergency information, i.e. the indication of the need for emergency charging/emergency filling, may be output visually and/or acoustically and/or haptically.

It is further expedient in connection with the configurability and control of the function of the support system by the driver if, upon meeting the emergency criterion, the autonomous driving is interrupted upon detection of a predefined control action taken by the driver. This means that the driver always has the option of interrupting the autonomous delivery of the motor vehicle to the charging location and/or to the filling location once the driver, if applicable, has knowledge of information available which render the process unnecessary, for example, a charging location and/or filling location located closer by, and the like.

It may be specifically provided that the emergency criterion checks based on its input data whether by continuing to drive, it is no longer possible to reach a current destination and/or another charging location and/or another filling location ascertained as not the nearest and/or as not optimal, taking into account the current supply of the at least one energy source. Thus, the emergency criterion monitors whether a currently known and/or predicted target destination can still be reached as the driving destination, taking into account the current circumstances, wherein the criterion may optionally also monitor in this case whether the available energy sources from the target destination are sufficient in order to be able to perform a necessary filling and/or charging. In the simplest embodiment, therefore, the method according to the invention monitors, when continuing along the driving route, known, for example, based on an input in a navigation system and/or based on a predicted driving route, whether it will even be possible in the future to reach a filling location and/or charging location on time where the drive energy of the motor vehicle can be replenished again, thus, fuel and/or electric energy can be taken on, before the motor vehicle is left stranded. In this case, a variety of aspects are considered in order to be able to prevent as reliably as possible the motor vehicle from stopping due to the lack of energy.

Thus, it may be provided that the emergency criterion includes multiple sub-criteria related to different aspects of the vehicle operation, which are entered weighted in the emergency criterion. In this case, it is of course conceivable, as previously described with respect to the conceivable specific embodiment of the emergency criterion, that the nearest filling option and/or charging option is not always immediately considered, but rather to check, for example, a charging option and/or filling option determined to be optimal in terms of availability, by also being able to take sub-criteria relating to a cost-savings potential into account. However, sub-criteria need not ultimately be related to the definition of an emergency, but may also relate to the availability of energy replenishment per se, thus, for example, taking in one sub-criterion the driving style of the driver and the like into account.

In addition to knowledge of information ascertained from driver assistance systems and, optionally, from additional vehicle systems, it may also be provided that the motor vehicle includes at least one sensor, where sensor data of the at least one sensor are used as input data of the emergency criterion. Sensor data may be utilized, for example, in order to monitor the fill level of the corresponding energy stores, (i.e., of the tank or of the battery), to determine the driving style of the driver, in the event this does not already occur in a driver assistance system, to ascertain surroundings conditions (for example, outside temperature, inside temperature, the elevation above sea level, weather conditions and the like), and/or to measure the current electrical consumption in the motor vehicle, (for example, the consumption of the alternator, of the air conditioning system and/or of the heaters).

In one particularly preferred embodiment of the present invention, it may be provided that the processing data used at least partially comprise result data of the at least one driver assistance system. Other driver assistance systems also achieve results in their calculations, which may be utilized particularly advantageously in connection with the support system, i.e., in the evaluation of the emergency criterion. Examples of this include driver information systems, which ascertain as result data, the remaining range of the motor vehicle and/or the supply of the at least one energy source. Predictions about the future driving route of the motor vehicle, which may be deduced, for example, from historical data about preceding operating phases of the motor vehicle, which may retrieve calendar entry dates, in particular, also via the Internet, and the like, may of course also be expediently utilized in conjunction with the present invention.

It may specifically be provided as an embodiment that a driver information system that ascertains the remaining range of the motor vehicle and/or the supply of the at least one energy source, and/or a congestion assistance system that evaluates traffic congestion reports in the surroundings of the motor vehicle, and/or a navigation system, and/or a cost efficiency system that analyzes energy source costs of different charging locations and/or filling locations, can be used as a driver assistance system, the processing data of which are used as input data in the emergency criterion.

According to the invention, the emergency criterion, in particular, has sub-criterion, which may also evaluate the alertness of the driver, in particular, utilizing result data of a fatigue detection system as a driver assistance system. Such data about the state of the driver not only provides information about which driving style is to be expected, and are therefore certainly relevant in assessing to what extent certain destinations cannot yet be reached, but may also be used to assess whether the driver him/herself is still able to recognize the lack of drive energy for the future. Thus, monitoring driver assistance systems offer drivers a useful source for input data for the emergency criterion.

As was previously indicated, it is expedient if the emergency criterion evaluates as input data, route data that describe a known and/or predicted future route of the motor vehicle with respect to the consumption of drive energy along the route. In this case, therefore, the support system utilizes technologies, with respect to predicting remaining ranges or in charge planning for electrical motor vehicles undertaken when not driving, in order to be able to particularly advantageously monitor the vehicle status with respect to the available drive energy, even while driving.

It should be noted, however, that the support system may also provide other functions that are useful in the context of the drive energy. Thus, a recommendation criteria, optionally activatable by the driver, may also be provided, which derives a recommendation from input data, which is able to ascertain a recommendation with respect to charging and/or filling prior to or at the start of an operating phase, i.e. at the onset of driving, which may then be output via corresponding display units and/or may be particularly advantageously integrated in the navigation to a destination so that, for example, the corresponding charging and/or filling locations may be sought out. In this function, it may be decided according to various criteria whether a charging and/or a filling is to or must take place as far as the imminent operating phase is concerned, for example, also with respect to optimum states of charge of a battery and/or of optimized costs for the first and/or second energy source. Nevertheless, even when utilizing the recommendation criterion with the corresponding recommendation function, the emergency criterion ensures that stranded vehicles are prevented to the extent possible throughout the entire operating phase.

An embodiment also relates to a motor vehicle, comprising
  at least one driver assistance system,
  an internal combustion engine as a drive means, which is operated using fuel as a first energy source for drive energy, and/or an electric motor, which is operated with electric energy of a fuel cell and/or a battery as a second energy source for drive energy, and
  a support system for preventing a vehicle from being left stranded due to a lack of drive energy, which includes a control unit designed for carrying out the method according to the invention.

The control unit in this case is expediently integrally designed with the control units of additional driver assistance systems and/or at least connected to corresponding control units of the additional driver assistance systems and/or of other vehicle systems, in particular, of the vehicle system for fully automatic guidance of the motor vehicle, which the latter, of course, also includes. All embodiments with respect to the method according to the invention may be applied analogously to the motor vehicle according to the invention, with which the previously mentioned advantages may also be obtained.

Additional advantages and details of the present invention arise from the exemplary embodiments described below and with reference to the drawings, in which:

FIG. 1 shows a schematic sketch of the functionality of the support system, and

Figure 2:
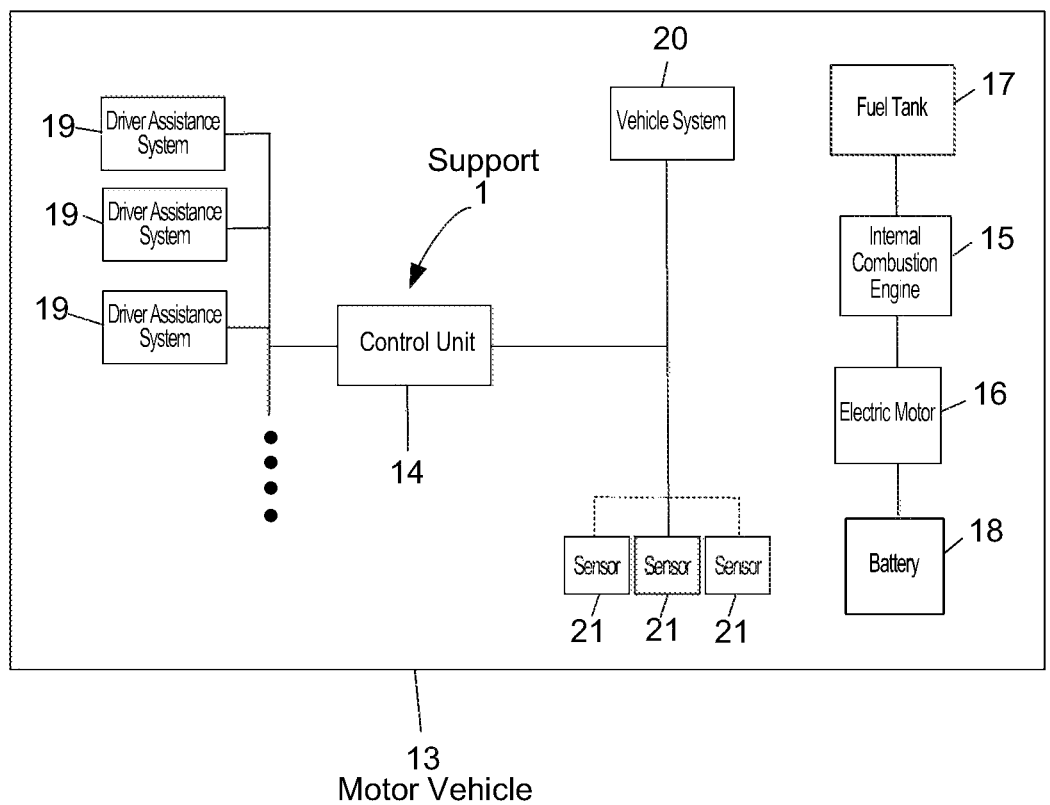
FIG. 2 shows a schematic sketch of a motor vehicle, according to certain embodiments of the invention.

FIG. 2 shows a schematic sketch of a motor vehicle according to certain embodiments of the invention.

FIG. 1 shows a schematic sketch of the functionality of a support system designed according to the invention for preventing a motor vehicle from being left stranded due to a lack of drive energy, wherein the support system is identified generally by the reference numeral 1. The support system 1 in the present case implements two functions, the one being represented by an emergency criterion 2, the other being represented by a recommendation criterion 3. Both functions utilize a variety of input data 4, 5, 6, 7, 8, 9 and 10, which are provided by additional driver assistance systems of the motor vehicle, by other vehicle systems of the motor vehicle and by sensors of the motor vehicle.

The input data 4 in the present case are result data of a driver information system, which ascertains the remaining range of the motor vehicle and/or the supply of the at least one energy source for drive energy; the input data 5 refer to various processing data, also comprising result data, of a navigation system, for example, digital map data and/or known or predicted driving routes, the input data 6 refer to processing data of a congestion assistance system that evaluates traffic congestion reports in the vicinity of the motor vehicle, the input data 7 refer to result data of a cost efficiency system that analyzes energy source costs of different charging locations and/or filling locations, and the input data 8 refer to information, in particular also provided by the navigation system, on service stations and/or charging devices as filling locations and/or as charging locations, respectively.

The input data 9 and 10 relate to sensor data, in the present case, for example, to sensor data that describe surroundings conditions of the operation of the motor vehicle and sensor data that describe the current electrical consumption for input data 9 and input data 10, respectively.

Additional input data may, of course, also be used by the support system 1. In particular, result data of a fatigue recognition system as a driver assistance system may also be used, in order to also be able to assess the alertness of the driver in the emergency criterion 2.

The recommendation criterion 3, models the drive energy situation each time at the beginning of an operating phase, in particular, before or during the departure, and provides general charging recommendations and/or filling recommendations expedient for the upcoming operating phase, where said recommendations may be outputted on a display unit of the motor vehicle and/or may also be used for adapting a route planned by the navigation system. The corresponding measures to be carried out upon departure when meeting the recommendation criterion are indicated by the boxes 11 in FIG. 1.

The emergency criterion, which in the present case includes various weighted integrated sub-criteria, checks during the entire current operating phase, in particular, the driving, of the motor vehicle, where whether by continuing to drive, it is no longer possible to reach the current destination and/or another charging location and/or another filling location ascertained as not the nearest and/or as not optimal, taking into account the current supply of the energy sources for the drive energy. In this case, the options for being able to continue to use the motor vehicle without an undesired stopping due to the lack of drive energy are reduced to a charging operation and/or filling operation to be made directly at the nearest (and/or otherwise strongly preferred) charging location and/or filling location. Output data of the emergency criterion 2, when met, box 12, therefore describe the autonomous operation of the motor vehicle, of a vehicle system of the motor vehicle designed for fully automatic guidance of the motor vehicle, by means of which the motor vehicle is driven fully automatically to a charging location and/or filling location.

This autonomous delivery of the motor vehicle to the charging location and/or to the filling location, wherein the nearest or optimal charging location and/or filling location is driven to as explained above, may be configurable by the driver, and can initially also be confirmable by the driver, or alternatively may take place directly. The driver may also interrupt the automatic movement of the motor vehicle to the charging location and/or to the filling location at any time, for example, if he/she is able to make the drive manually or he/she has personal information as to how the necessary drive energy may otherwise be procured.

In this regard, FIG. 2 shows a schematic sketch of a motor vehicle 13 according to the invention, which includes a control unit 14 associated with the support system 1, which is designed to carry out the method according to the invention. The motor vehicle 13 in the present case is designed as a hybrid vehicle and includes both an internal combustion engine 15 as well as an electric motor 16. The internal combustion engine 16 is accordingly associated with a tank 17 for fuel, and the electric motor 16 is associated with battery 18, also rechargeable via the electric motor, for storing electric energy as an energy source.

To be able to evaluate the emergency criterion 2 (and also the recommendation criterion 3), the control unit 14 is connected via a bus system of the motor vehicle 13, for example, a controller area network (CAN) bus system, to driver assistance systems 19, comprising the aforementioned driver assistance systems, and also to a vehicle system 20 designed for fully automatic guidance of the motor vehicle, and to sensors 21. Other vehicle systems may, of course, also be provided, which are not depicted herein in greater detail, in particular, display units and/or operating means.

The invention claimed is:

1. A method for operating a support system of a motor vehicle, wherein the motor vehicle has at least one driver assistance system, the method comprising:
    operating the motor vehicle using an internal combustion engine with fuel as a first energy source of drive energy, and/or using an electric motor with electric energy of a battery as a second energy source of the drive energy;
    providing a support system comprising an emergency criterion and a recommendation criterion;
    continuously evaluating meeting of the emergency criterion during an operational phase of the motor vehicle by a vehicle system, wherein said continuously evaluating includes processing data of the at least one driver assistance system as at least one part of input data being evaluated;
    deriving the recommendation criterion from the input data being evaluated;
    indicating to a driver that the motor vehicle will be left stranded if a charging and/or filling process is not carried out;
    upon notifying the driver regarding emergency information, and in response to determining that a confirmation of the driver is required for driving the motor vehicle autonomously when the emergency criterion and the recommendation criterion are met, taking control of the motor vehicle away from the driver, and driving the motor vehicle autonomously to a charging location and/or to a filling location using the vehicle system, wherein the vehicle system is designed to guide the motor vehicle in a fully automatic manner in response to the emergency criterion and the recommendation criterion being met, wherein the emergency criterion comprises an assessment of an alertness of the driver and the recommendation criterion comprises charging or filling recommendations, and wherein the confirmation comprises at least one of the driver interrupting the fully automatic manner or the driver allowing the fully automatic manner; and
    preventing the motor vehicle from being left stranded due to a lack of the drive energy.

2. The method of claim 1, wherein when the emergency criterion is met, autonomous driving takes place after an output of corresponding information regarding the emergency criterion to the driver, and a subsequent confirmation by the driver is received.

3. The method of claim 1, wherein the evaluating the emergency criterion is based on the input data as to whether, by continuing to drive, it is no longer possible to reach a current destination and/or another charging location and/or another filling location ascertained by the vehicle system as not a nearest station and/or as not optimal, relative to available supply of the first energy source or the second energy source.

4. The method of claim 1, wherein the emergency criterion includes multiple sub-criteria related to different aspects of a vehicle operation, which are entered weighted in an evaluation of the emergency criterion by the vehicle system.

5. The method of claim 2, wherein the evaluating the emergency criterion is carried out via a control unit.

6. The method of claim 5, wherein the motor vehicle includes at least one sensor coupled to the control unit, wherein sensor data from the at least one sensor are used as input data of the emergency criterion.

7. The method of claim 5, wherein the processing the data of the at least one driver assistance system comprises processing result data from calculations of the at least one driver assistance system.

8. The method of claim 5, wherein the processing data of the at least one driver assistance system comprises prediction data deduced from historical data of the operational phase of the motor vehicle.

9. The method of claim 8, wherein prediction data comprises predictions of a future driving route of the motor vehicle, wherein the evaluating the emergency criterion occurs in conjunction with detection and evaluation of a remaining range of the motor vehicle.

10. The method of claim 1, wherein the at least one driver assistance system, the processing data of which is used in an evaluation of the emergency criterion being met, is selected from at least one or more of the following: a driver information system that ascertains a remaining range of the motor vehicle or available supply of the first energy source or the second energy source, a congestion assistance system that evaluates traffic congestion reports in surroundings of the motor vehicle, a navigation system, a cost efficiency system that analyzes energy source costs of different charging locations, and a driver assistance system using filling locations are used as the driver assistance system.

11. The method of claim 10, wherein the evaluating the emergency criterion further includes evaluating route data describing a known and/or predicted future route of the motor vehicle with respect to a consumption of energy along the known and/or predicted future route.

12. The method of claim 11, wherein the evaluating the route data describing the known and/or predicted future route of the motor vehicle with respect to the consumption of energy along the known and/or predicted future route is evaluated with respect to the first energy source.

13. The method of claim 11 wherein the evaluating the route data describing the known and/or predicted future route of the motor vehicle with respect to the consumption of energy along the known and/or predicted future route is evaluated with respect to the second energy source.

14. The method of claim 1, wherein the driving the motor vehicle autonomously upon the emergency criterion being met is interrupted upon detection of a predefined control action taken by the driver.

15. A motor vehicle, comprising:
an internal combustion engine with fuel as a first energy source of drive energy, and/or using an electric motor with electric energy of a battery as a second energy source of the drive energy; and
a support system comprising a control unit electrically coupled to a plurality of driver assistance systems, wherein the support system prevents the motor vehicle from being left stranded due to a lack of the drive energy, and the support system comprises an emergency criterion and a recommendation criterion, the control unit configured to:
continuously evaluate meeting of an emergency criterion during an operational phase of the motor vehicle by a vehicle system, wherein to continuously evaluate, the control unit is configured to process data of at least one driver assistance system of the plurality of driver assistance systems as at least one part of input data being evaluated,
derive the recommendation criterion from the input data being evaluated,
indicate to a driver of the motor vehicle that the motor vehicle will be left stranded if a charging and/or filling process is not carried out,
upon notifying the driver regarding emergency information, and in response to determining that a confirmation of the driver is required for driving the motor vehicle autonomously when the emergency criterion and the recommendation criterion are met, take control of the motor vehicle away from the driver, and drive the motor vehicle autonomously to a charging location and/or to a filling location using the vehicle system, wherein the vehicle system is designed to guide the motor vehicle in a fully automatic manner in response to the emergency criterion and the recommendation criterion being met, wherein the emergency criterion comprises an assessment of an alertness of the driver and the recommendation criterion comprises charging or filling recommendations, and wherein the confirmation comprises at least one of the driver interrupting the fully automatic manner or the driver allowing the fully automatic manner; and
prevent the motor vehicle from being left stranded due to a lack of the drive energy.

16. The motor vehicle of claim 15, wherein one of the plurality of additional driver assistance systems is a fatigue detection system for evaluating the alertness of the driver, wherein an output from the fatigue detection system is used as input data being evaluated for meeting of the emergency criterion.

17. The motor vehicle of claim 15, wherein the control unit and the plurality of additional driver assistance systems are present in an integral construction.

18. The motor vehicle of claim 15, wherein the control unit is electrically coupled to the plurality of additional driver assistance systems via a controller area network (CAN) bus system of the motor vehicle.

19. The motor vehicle of claim 16, wherein when the emergency criterion is met, the driving of the motor vehicle autonomously may be interrupted by a predefined control action taken by the driver.

20. The method of claim 1, further comprising upon notifying the driver regarding the emergency information, and in response to determining that a prior confirmation of the driver is required for driving the motor vehicle autonomously when the emergency criterion is met, driving the motor vehicle autonomously to a charging location and/or to a filling location using the vehicle system upon receiving the prior confirmation of the driver.

* * * * *